United States Patent [19]

Knudsen

[11] 4,435,159

[45] Mar. 6, 1984

[54] APPARATUS FOR THERMALLY TREATING PULVEROUS MATERIALS SUCH AS CEMENT RAW MATERIAL

[75] Inventor: Hans B. Knudsen, Kolding, Denmark

[73] Assignee: F. L. Smidth & Co., Cresskill, N.J.

[21] Appl. No.: 321,725

[22] Filed: Nov. 16, 1981

[30] Foreign Application Priority Data

Nov. 17, 1980 [GB] United Kingdom ................ 8036837

[51] Int. Cl.[3] .......................... F27B 7/02; C04B 7/02

[52] U.S. Cl. .................................... 432/106; 106/100

[58] Field of Search ......................... 432/14, 106, 113; 106/100

[56] References Cited

U.S. PATENT DOCUMENTS

| | | | |
|---|---|---|---|
| 2,489,211 | 11/1949 | Witt | 432/67 |
| 2,776,132 | 1/1957 | Pyzel | 106/100 |
| 3,013,786 | 12/1961 | Pyzel | 106/100 |
| 3,203,681 | 8/1965 | Rosa et al. | 106/100 |
| 3,603,568 | 9/1971 | Ritzmann | 432/58 |
| 3,744,962 | 7/1973 | Ritzmann | 432/58 |
| 3,758,266 | 9/1973 | Retali et al. | 432/14 |
| 3,799,735 | 3/1974 | Jensen | 432/16 |
| 3,964,922 | 6/1976 | Nishida et al. | 106/100 |
| 4,256,502 | 3/1981 | Lovichi et al. | 106/100 |
| 4,315,734 | 2/1982 | Ramesohl et al. | 432/106 |
| 4,342,598 | 8/1982 | Kogan | 106/100 |
| 4,363,668 | 12/1982 | Herchenbach | 432/106 |

FOREIGN PATENT DOCUMENTS

| | | |
|---|---|---|
| 2061980 | 7/1972 | Fed. Rep. of Germany . |
| 2738987 | 3/1979 | Fed. Rep. of Germany . |
| 2923448 | 12/1979 | Fed. Rep. of Germany . |
| 2279043 | 2/1976 | France . |
| 457957 | 12/1936 | United Kingdom . |
| 959446 | 6/1964 | United Kingdom . |
| 1396402 | 6/1975 | United Kingdom . |
| 1434091 | 4/1976 | United Kingdom . |
| 1446241 | 8/1976 | United Kingdom . |

*Primary Examiner*—John J. Camby
*Attorney, Agent, or Firm*—Pennie & Edmonds

[57] ABSTRACT

An apparatus is disclosed for burning cement clinker which includes a preheater with inlet and outlet for heating gas and inlet and outlet for pulverous cement raw material, a suspension calciner with inlets for fuel, combustion air and preheated raw materials, outlet for combustion gas connected to the heating gas inlet of the preheater, and outlet for calcined material, communicating with the material inlet of a sintering furnace. The sintering furnace includes an inlet for fuel and combustion air, outlet for combustion gas communicating with the heating gas inlet of the preheater and an outlet for the sintered product connected to the material inlet of an air cooler for cooling the sintered product. The air cooler includes an air outlet connected both to the air inlet of the sintering furnace and to the air inlet of the suspension calciner. The sintering furnace is preferably in the form of a cylindrical drum rotatable around a slightly inclined axis and includes a suspension inlet duct provided with a material inlet and having a first end connected to the air outlet of the cooler and a second end connected to the upper end of the sintering drum substantially tangentially to the inner circumferential surface of the sintering drum. A fuel inlet or fuel inlets project into the suspension inlet of the sintering drum and/or into the suspension inlet duct. A combustion gas outlet duct is connected to one end of the sintering drum, and an outlet is provided for the sintered product at the lower end of the sintering drum.

22 Claims, 23 Drawing Figures

APPARATUS FOR THERMALLY TREATING PULVEROUS MATERIALS SUCH AS CEMENT RAW MATERIAL

TECHNICAL FIELD

The invention relates to a plant for burning pulverulent raw materials, such as cement raw meal, to form cement clinker

BACKGROUND ART

For many years the manufacture of cement from cement raw meal has taken place in plants of the type having:

(a) a preheater with an inlet and outlet for heating gas and an inlet and an outlet for pulverous cement raw material;

(b) a suspension calciner with inlets for fuel, combustion air and preheated raw material, an outlet for combustion gas connected to the heating gas inlet of the preheater and an outlet for calcined material communicating with a material inlet of;

(c) a sintering furnace with inlet for fuel and combustion air, an outlet for combustion gas communicating directly or indirectly with the heating gas inlet of the preheater and an outlet for the sintered product connected to a material inlet of;

(d) an air cooler for cooling the sintered product with an air outlet connected to both the air inlet of the sintering furnace and the air inlet of the suspension calciner.

Plants of this kind are known from U.S. Pat. No. 3,203,681 and British Patent Specification No. 1,434,091 according to which a short rotary kiln is used as sintering furnace.

The characteristic feature of this kind of plant is that the heat treatment of the cement raw material necessary for the manufacture of cement clinker takes place in three separate zones of the plant corresponding to the three heat treatment phases: preheating substantially to calcining temperature; calcining; and final heat treatment comprising heating to sintering temperature and sintering.

By this process improved heat economy and improved control of the phases of the process are achieved as compared with earlier plants in which the entire heat treatment took place in a long rotary kiln.

The rotary kiln is however not an ideal apparatus, the essential drawback being the relatively inefficient heat transfer during the process of heating the material from calcining to sintering temperature. Because of this the machinery dimensions are necessarily large, resulting in high initial apparatus cost, a substantial heat loss, and a considerable thermal inertia leading to long starting up periods as well as control problems.

Another disadvantage of the rotary kiln as a sintering reactor is the rather limited number of variable process parameters which are available. As a result it is difficult at the same time to optimise both the heating process and the crucial sintering process where the formation of the clinker minerals takes place.

Over the years numerous proposals have been made for sintering furnaces which do not present the inherent disadvantages of the rotary kiln. See, for example, U.S. Pat. Nos. 2,776,132 and 3,013,786 (sintering in fluid bed); and U.S. Pat. No. 2,489,211, British Patent Specification 959,446 and U.S. Pat. No. 3,603,568 (sintering in suspended state). However, essentially due to the sticky nature of cement raw material at sintering temperature, none of these solutions have functioned quite satisfactorily, which accounts for the fact that up to now the final heat treatment is still in practice carried out in a rotary kiln.

I have invented an apparatus of the kind described in which the final heat treatment can be performed in small compact machinery under easy control, while minimizing the heat loss and problems caused by the sticky nature of the sintering material.

DISCLOSURE OF THE INVENTION

The invention relates to an apparatus for thermally treating pulverulent materials which comprises:

(a) preheating means having inlet and outlet means for heating gas and raw materials; (b) suspension calcining means having inlet means for fuel, combustion air and preheated raw materials, combustion gas outlet means communicating with the heating gas inlet means of the preheating means; (c) sintering furnace means having inlet means for fuel and combustion air, and combustion gas outlet means communicating with the heating gas inlet means of said preheating means, and outlet means for the sintered product, the calcined material outlet means of the suspension calcining means communicating with the material inlet means of the sintering furnace means; (d) air cooling means for cooling the sintering product, the air cooling means having air outlet means communicating with the air inlet means of the sintering furnace means and with the air inlet means of the suspension calcining means, and material inlet means communicating with the sintering furnace means; (e) the sintering furnace means comprising at least one sintering drum rotatable about an axis inclined with respect to the horizontal and suspension inlet duct means provided with material inlet means and having at least a first end portion communicating with the air outlet means of the material cooling means and at least a second end portion communicating with the upper end portion of the sintering furnace means; (f) fuel inlet means projecting into at least one of the material inlet means of the sintering furnace means and the suspension inlet duct means; (g) combustion gas outlet duct means communicating with at least one end portion of the sintering furnace means; and (h) material outlet means for the sintered product at the lower end portion of the sintering furnace means.

As will be seen from the detailed description hereinbelow, according to the invention an apparatus is provided of the kind described which is characterized in that the sintering furnace comprises:

(e) a cylindrical member rotatable around a slightly inclined axis defining a sintering drum, (f) a suspension inlet duct provided with a material inlet and having a first end connected to the air outlet of the cooler and a second end connected to the upper end of the sintering drum substantially tangentially to the inner circumferential surface of the sintering drum, (g) a fuel inlet/fuel inlets projecting into the suspension inlet of the sintering drum or/and into the suspension inlet duct;

(h) a combustion gas outlet duct connected to one end of the sintering drum, and (i) an outlet for the sintered product at the lower end of the sintering drum.

In this apparatus the final heat treatment can be performed in a particularly advantageous way. Thus the calcined material is introduced in the suspension inlet duct and suspended in the hot exit air from the cooler. Since fuel is introduced, heat is transferred from the burning fuel to the suspended calcined material providing a heating substantially to sintering temperature which is far more rapid and efficient than in a rotary kiln.

The critical phase during which the material heated to the sintering temperature is separated from the suspension takes place mainly in the upper part of the sintering drum, which acts as a horizontal cyclone because the tangential direction of the suspension causes a rapid helical movement of the suspension in the sintering drum.

In use the sintering drum is kept slowly rotating so that the inherent tendency of the material to stick together and form cakings will not lead to problems because the sintering drum will act not only as a separator but at the same time in a known manner as a rotating agglomeration drum.

On the contrary the sticky character of the material will advantageously cause a preliminary agglomeration of the fine material during the separation, which promotes spearation efficiency as well as a good rate of agglomeration.

Even the tendency to form cakings will be advantageous, because it will lead to lining-protecting crust formation in the drum, as in the hot zones of an ordinary rotary kiln.

The final agglomeration and the sintering proper during which the clinker minerals are formed will mainly take place while the separated material is passing through the rotating sintering drum, i.e. under conditions which can be controlled independently of the heating and separating process, for example, by varying the speed of rotation of the sintering drum.

The improved heat transfer permits a radical reduction of the apparatus dimensions with consequent advantages, and the use of low grade fuel which is not suitable for traditional sintering due to an insufficiently high flame temperature.

In cases of particular tendency to formation of cakings due to the raw material composition it is advantageous to provide a fuel inlet at the suspension inlet of the sintering drum.

In this case, the material is not heated quite to the sintering temperature in the suspension directly but merely to an intermediate temperature at which the material has not yet become so sticky that it causes problems, the last heating taking place inside the upper part of the sintering drum. Thus, the risk of formation of cakings outside the sintering drum is virtually eliminated. In addition, according to the invention a very efficient heating to the sintering temperature is achieved in the upper end of the sintering drum, where heat is transferred both while the material in the upper end of the drum is still in a suspended state, and while the material, during the separation, rotates along the inner surface of the upper part of the drum in an annular material layer presenting a substantially larger heat transferring surface layer than in a traditional rotary kiln.

The sintered material discharged from the drum may be directed directly to a clinker cooler of known type for example, a grate cooler or a rotary drum cooler, but it may also be subjected to an after sintering in a small rotating drum before it is directed to the clinker cooler.

The advantage of carrying out the sintering at two stages is that the material separation phase and part of the sintering phase are kept apart so that the latter may take place in a drum having a particularly small radius, i.e., having particularly small heat loss.

In one construction, the sintering drum is provided with a constriction member situated at a distance from the material inlet constituting approximately one third of the total length of the sintering drum.

This constriction member, which is preferably provided as a thickening of the lining in the sintering drum, and which preferably has an inner diameter constituting 40–80% of the inner diameter of the sintering drum provides a corresponding division of the sintering drum into separating and sintering sections. Highly effective material separation is thus ensured.

The preheater is preferably a multistage cyclone suspension preheater through which the material is passed countercurrently to the heating gas and repeatedly suspended in and separated from the gas.

As the temperature of the exit gas from the sintering drum is rather high, about 1400° C. as compared with about 1100° C. for the normal temperature of exit gas from a traditional rotary kiln, it is, for reasons of heat economy, expedient not to pass this exit gas directly to the preheater, but indirectly through the suspension calciner, e.g., via the calciner air inlet.

In order to avoid possible condensation problems in the combustion gas outlet duct of the sintering drum, it may be advantageous to procure a quenching of the exit gas to the calcining temperature of about 850° C. This may be achieved by a construction in which the sintering furnace combustion gas outlet duct is provided with an inlet for preheated material. The temperature of the exit gas from the sintering furnace is thus immediately quenched upon contact with the uncalcined material which becomes suspended in the gas. The preheated material is then introduced into the calciner suspended in the exit gas from the sintering furnace.

If a less abrupt quenching of the exit gas is desired this may be obtained by another arrangement in which the sintering furnace combustion gas duct is provided with an inlet for calcined material and a cyclone separator defining a heat exchange unit for calcined material, the gas outlet of the cyclone being connected to the air inlet of the suspension calciner, and the material outlet of the cyclone being connected to the material inlet of the suspension calciner. Such heat exchange unit is advantageous because the temperature of the material introduced in the suspension inlet duct is thereby increased; consequently less firing in the sintering furnace is necessary and this again means smaller dimensions of the sintering furnace.

The outlet for the sintered product may simply be an opening in the lower part of a fixed end wall at the lower end of the sintering drum communicating with the cooler via an ordinary hood which may further be provided with outlets for hot exit air from the cooler communicating with the air inlets of the suspension calciner and the first end of the suspension inlet duct, respectively.

Only minor amounts of hot exit gas from the cooler will enter the sintering drum via this opening when the area of the opening is small. This small amount of false air entering into the drum will be advantageous in providing a precooling of the sintered product before it is directed to the cooler.

The combustion gas outlet duct may be arranged in either end of the sintering drum. When arranged in the lower end a preferred embodiment of the invention is characterized in that the outlet for the sintered product, the lowest part of the sintering drum and the combustion gas outlet duct, provide the connection between the air outlet of the cooler and the air inlet of the suspension calciner.

By this is achieved firstly, a relatively uncomplicated apparatus design, secondly, advantageous precooling of the sintered product, and thirdly advantageous quenching of the combustion gas at the combustion gas exit.

Besides the above mentioned preferred embodiments of plants with multistage cyclones arranged in one string it can, particularly in the case of plants with large production capacity, be advantageous in a manner known per se, (see for example, British Patent Specification No. 1,434,091) to provide the preheater as a two string multistage cyclone suspension preheater, each string being provided with separate material and heating gas inlets and outlets, the heating gas inlet of the calciner/sintering furnace string being connected to the combustion gas outlet of the calciner/sintering furnace, respectively.

In one construction incorporating this two string version, the sintering furnace combustion gas duct is provided with an inlet for calcined material and a cyclone separator defining a heat exchange unit for calcined material, the gas outlet of the cyclone being connected to the heating gas inlet of the sintering furnace string. This provides an advantageous quenching of the exit gas from the sintering furnace similar to the quenching described above.

In its simplest form the material inlet duct of the drum may merely be a pipe directed with a tangential component towards the inner side of the cylinder wall of the drum, but an advantageous embodiment is characterized in that the tangential connection between the second end of the suspension inlet duct and the upper end of the sintering drum is provided via a stationary cylindrical member which is coaxial with, and smaller in diameter than, the sintering drum, and defines a spiral flow chamber with a tangential suspension inlet and an axial suspension outlet communicating with the sintering drum.

The advantage of using this stationary spiral flow chamber is that it is possible to reduce the area of the fixed end wall at the upper part of the sintering drum and let the peripheral part of the end wall be fixed to the sintering drum. In this way problems of procuring an airtight connection between movable and stationary apparatus parts are reduced.

The gas velocity in the suspension inlet duct is desirably at a level so high that the suspended particles and the gas have almost the same velocity. Further, it is very desirable that the gas undergoes no violent changes of direction. The number of collisions between particles and walls are thus kept to a minimum, and as a result the caking problem will be negligible.

The fuel may be introduced above, below or at the same height as the material.

In order further to eliminate the risk of cakings it is possible, in a known manner, to draw in a gas along the walls of the suspension inlet duct.

If additional fuel is added at the material inlet of the sintering drum, inlets may be provided for secondary air at the same place.

The suspended material will thus be heated to the sintering temperature and separated from the suspension in a few seconds. The retention time of the separated material during which the proper sintering and formation of clinker minerals take place will typically be 7–12 minutes.

Typical sintering drum dimensions are D:4 m (meters), L:12–20 m (meters). The rotational speed of the drum is typically 1–4 r.p.m. (revolutions per minute). A typical inclination of the drum will be 3° (degrees). The degree of filling in the drum is typically 15–20 percent. The production capacity of such a plant is typically 2000 tons/24 hours.

BRIEF DESCRIPTION OF THE DRAWINGS

Some examples of plants constructed in accordance with the invention are described hereinbelow with reference to the accompanying drawings, wherein.

BEST MODE FOR CARRYING OUT THE INVENTION

Figure 1:
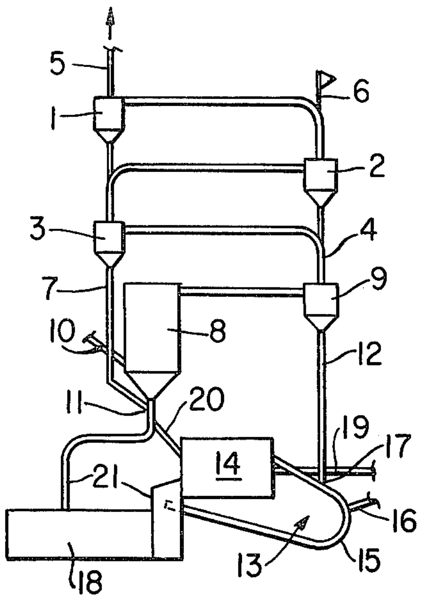
FIGS. 1–11 illustrate various plants having a one-string preheater.

In the figures the same reference numbers are used for identical plant parts.

The apparatus shown in FIGS. 1–11 includes:

A suspension preheater comprising cyclones 1, 2 and 3, an inlet 4 and an outlet 5 for heating gas and an inlet 6 and an outlet 7 for pulverous cement raw material; a suspension calciner with a calcination chamber 8 provided with a separating cyclone 9, an inlet 10 for fuel, an inlet 11 for combustion air and preheated raw material, and an outlet 12 for calcined material from the separating cyclone 9; a sintering furnace 13 comprising a sintering drum 14 rotatable around an axis which is slightly inclined to the horizontal downwards from right to left, a suspension inlet duct 15 provided with inlets 16 and 17 for fuel and material, respectively, and having a first end connected to an air cooler 18 and a second end connected to the upper end of the drum 14, the drum 14 being provided with an inlet 19 for fuel, and provided with a gas outlet duct 20 axially connected to one end of the drum 14, and an air cooler 18 for cooling the sintered material having an air outlet 21 connected to both the suspension inlet duct 15 of the sintering furnace 13 and the air inlet 11 of the calciner. According to the invention both fuel inlets 16 and 19 may be present, however, one of them may be omitted.

Figure 7:
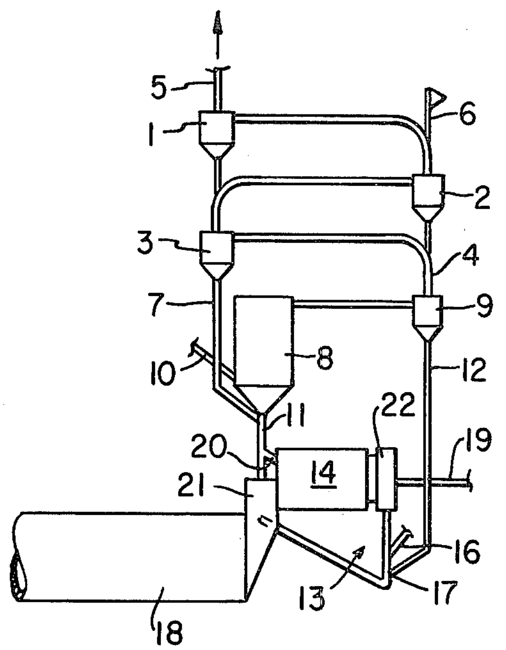
Figure 8:
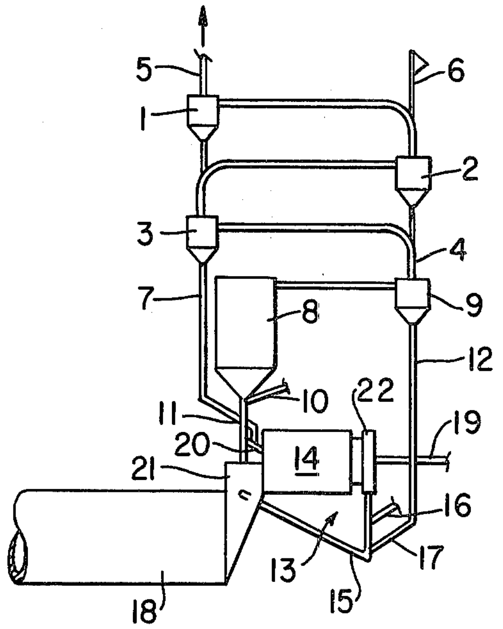
Figure 9:
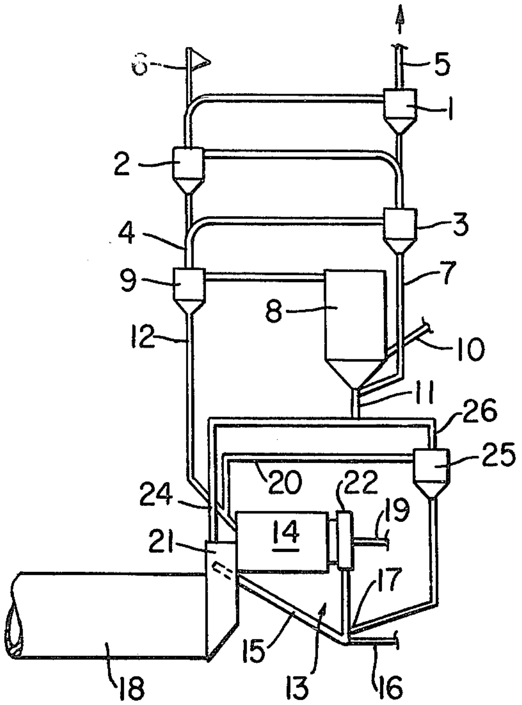
Figure 15:
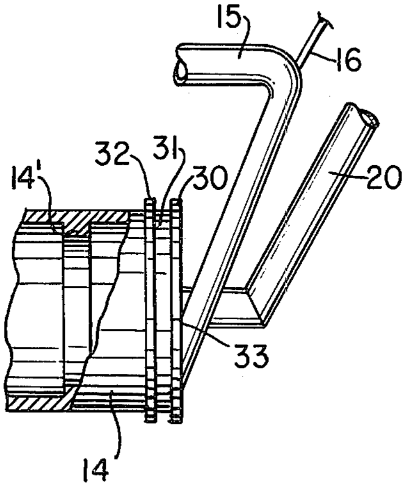
FIGS. 14–17 illustrate variations of the connection between the suspension inlet duct and the sintering drum.
Figure 14:
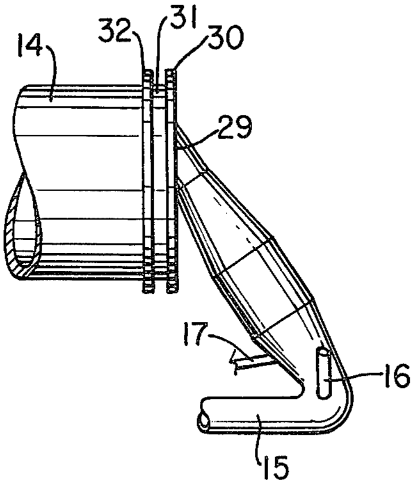
Figure 16:
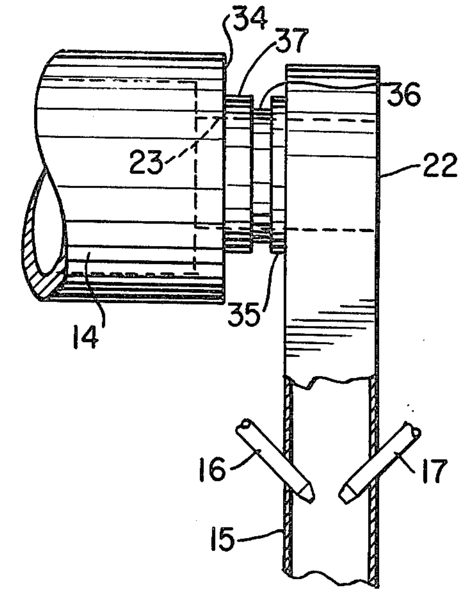
Figure 17:
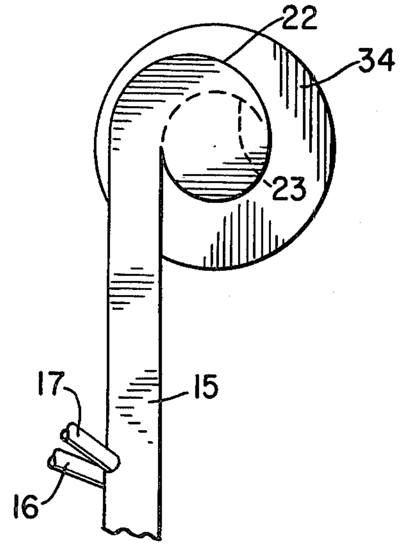

In FIGS. 1–6 and 10–11, the suspension inlet duct 15 is directed tangentially towards the inner side of the cylindrical drum wall as shown in more detail in FIGS. 14–15, whereas in FIGS. 7–9 the suspension inlet duct 15 is designed with a spiral flow chamber 22 as shown in more detail in FIGS. 16 and 17.

In both cases the suspension will perform a rapid helical movement in the upper part of the drum 14. However, when using the spiral flow chamber with axial introduction of the suspension into the sintering drum through a central inlet 23 the problems of creating an air-tight connection between movable and stationary parts of the sintering furnace 13 are reduced.

Figure 2:
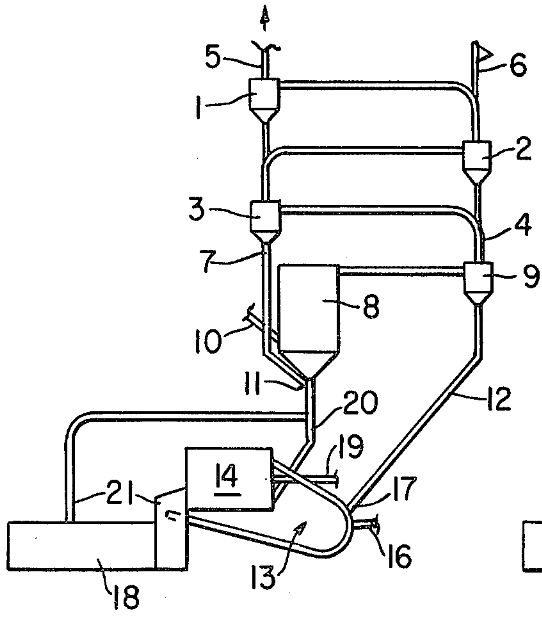

FIGS. 1 and 2 show the cooler 18 as a grate cooler which may be provided with a (not shown) duct for excess hot cooling air. The remaining Figs. illustrate the use of a rotary drum cooler. Of course the grate cooler in FIGS. 1 and 2 can be replaced by a rotary drum cooler and vice versa.

As the mode of operation and advantages of the various examples have been explained in detail above, the following will just concentrate on the further features which distinguish the apparatus shown in FIGS. 1–11 from one another.

In the apparatus of FIGS. 1 and 2 preheated material is passed via the duct 7 directly to the calciner. In FIG. 1, the combustion gas outlet duct of the drum 14 is provided at the lower end of the drum 14, but in FIG. 2 the duct 20 is provided in the upper end of the drum 14 besides the inlet from the suspension inlet duct 15.

Figure 3:
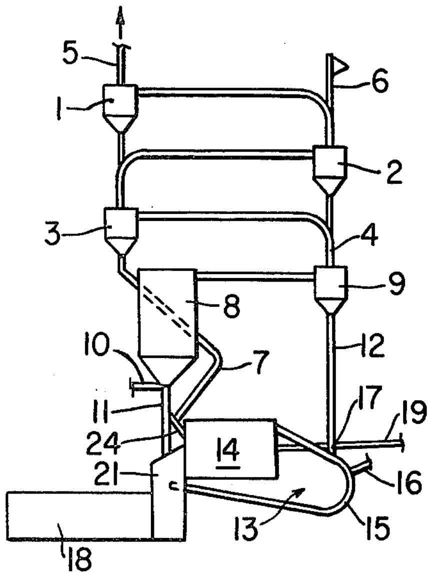
Figure 4:
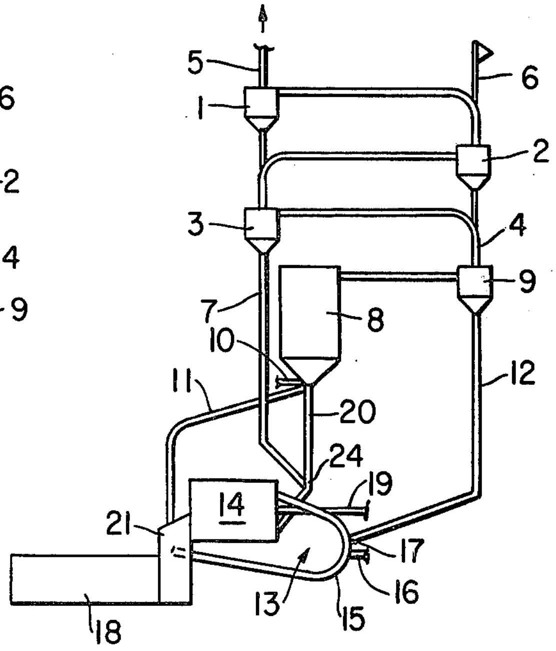

In the apparatus in FIGS. 3 and 4 preheated material is passed via the duct 7 to a material inlet 24 in the outlet duct 20 of the drum 14. The duct 20 is connected to the lower end of the drum 14 in FIG. 3 and to the upper end of the drum 14 in FIG. 4.

Figure 5:
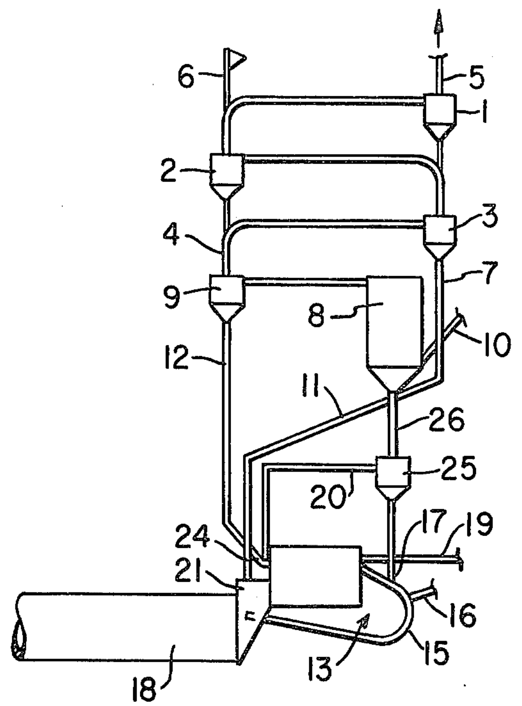
Figure 6:
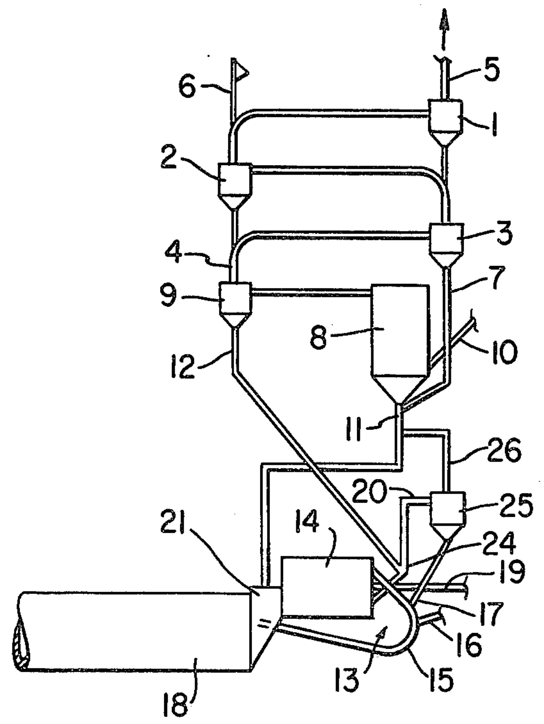

In the apparatus in FIGS. 5 and 6 preheated material is passed via the duct 7 directly to the calciner, whereas calcined material is passed via the duct 12 to a heat exchange unit for calcined material before it is introduced into the suspension inlet duct. The calcined material is passed via the duct 12 to the material inlet 24 in the duct 20, which in FIG. 5 is connected to the lower end, and in FIG. 6, to the upper end of the drum 14. The duct 20 is provided with a cyclone separator 25 with a gas oulet 26 being connected to the gas inlet 11 of the calciner, and an outlet for heated material connected to the material inlet 17.

The apparatus in FIGS. 7, 8, and 9 correspond completely to the apparatus of FIGS. 1, 3, and 5, respectively, except for the suspension inlet duct 15 being constructed as explained with reference to FIGS. 14 and 15.

Figure 11:
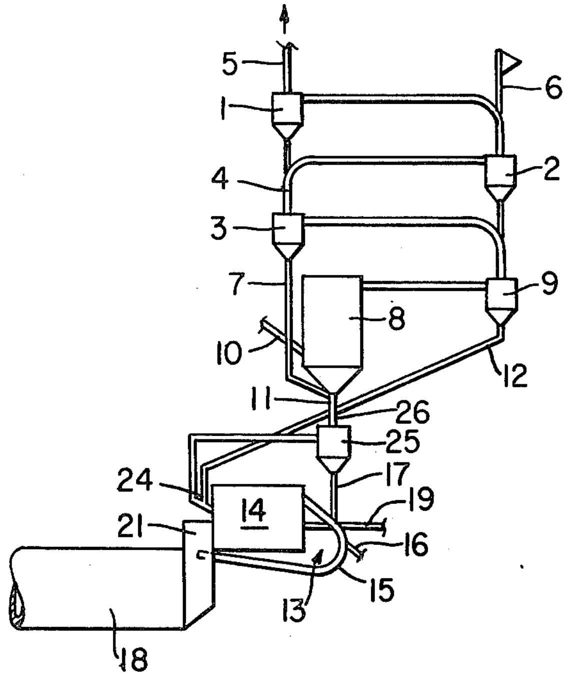
Figure 10:
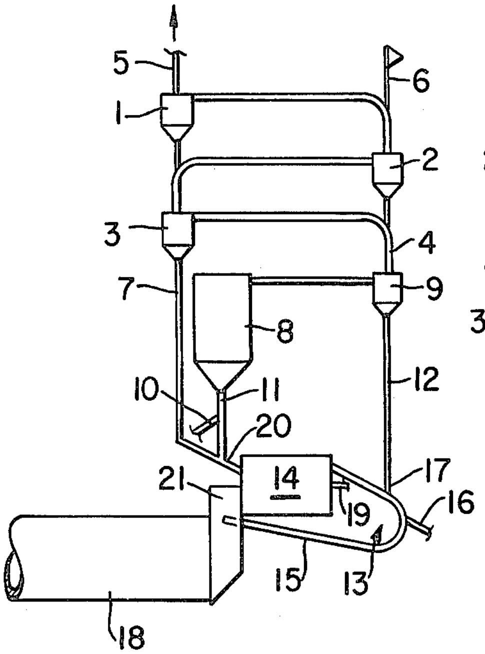

FIGS. 10 and 11 show two embodiments corresponding to the apparatus shown in FIGS. 3 and 5, respectively. However, the hot exit air for the calciner is drawn through an opening for the clinker leaving the sintering drum 18 where it provides a precooling of the clinker and quenching of the exit gas from the sintering drum. The gas air mixture then passes to the calciner via the duct 20, directly according to FIG. 10, or via a heat exchanger unit 25 for calcined material according to FIG. 11.

Figure 12:
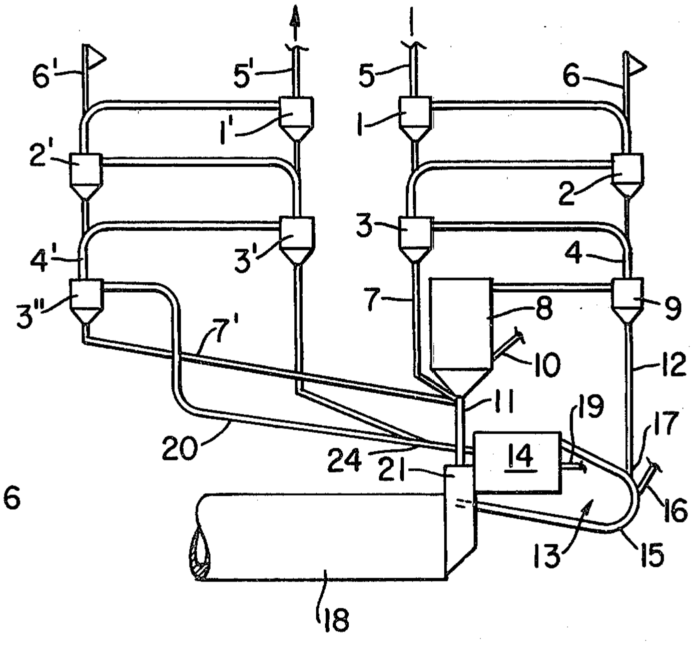
FIGS. 12–13 illustrate various plants having a multi-string preheater.
Figure 13:
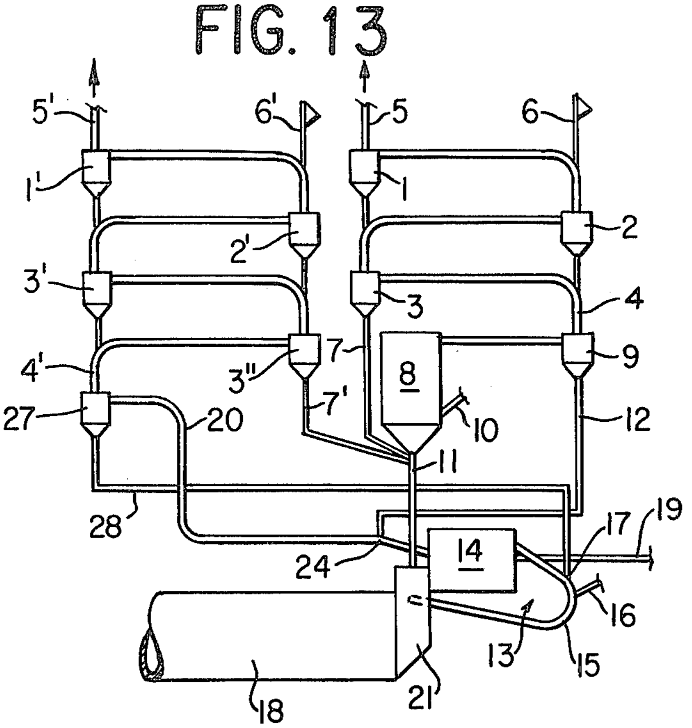

FIGS. 12 and 13 show corresponding two string apparatus with a calciner preheater string having cyclones 1, 2 and 3, gas inlet 4, gas outlet 5, material inlet 6, and outlet 7 and a sintering furnace preheater string having corresponding components marked with a prime.

FIG. 12 shows a simple form of the two string embodiment, where the cold raw material is introduced and preheated in the preheaters, whereafter the preheated material is united and introduced and calcined in the calciner. The calcined material is then suspended in the suspension inlet duct 15, burned with fuel introduced through the fuel inlet 16 and/or 19, precipitated, agglomerated and sintered in the sintering drum 14 and air cooled in the air cooler 18.

The hot exit air from the cooler is divided into two parts. The first part being introduced in the suspension calciner 8, where it is used for burning the fuel introduced through fuel inlet 10. The resulting combustion gas is, via the separating cyclone, directed to the calciner preheater. The second part of the exit air is introduced to the suspension inlet duct, where it is used for burning the fuel introduced through fuel inlet 16 and/or 19. The resulting combustion gas is, via the sintering drum 14, directed to the sintering furnace preheater string.

FIG. 13 shows a preferred embodiment of the two string system differing from the apparatus illustrated in FIG. 12 in having an extra heat exchange for the calcined material. The calcined material is suspended in the exit gas from the sintering drum 14, the material is separated in a cyclone 27 with a gas outlet connected to the sintering furnace preheater string and a material outlet 28 connected to the material inlet of the suspension inlet duct 15.

In all cases the gas flow may be established by a fan (not shown) arranged at the outlets 5 for heating gas, and the distribution of the flows of hot exit air from the cooler to suspension furnace and calciner, respectively, may be controlled by means of a valve arranged in the suspension inlet duct.

If desired the gas outlet duct 20 of the sintering furnace may be provided with a by-pass as in the rotary kiln technology.

FIGS. 14 and 15 show as a schematic side view direct substantially tangential inlets of the second end of the suepension inlet duct into a rotarty drum 14 having an end flange 32 sealed with a sealing 31 to a stationary end wall 30 equipped with an opening 29 connected with the second end of the suspension inlet pipe. FIG. 14 coresponds to a detail of the apparatus shown in FIG. 1 where the combustion gas outlet duct 20 is situated at the opposite end of the sintering drum. FIG. 15 corresponds to the apparatus shown in FIG. 4 in which the combustion gas outlet duct is situated at the upper end of the sintering drum communicating with the drum via an opening 33 in the end wall 30 and shows a constriction member 14' provided as a thickening of the lining in the rotary drum 14.

FIGS. 16 and 17 show as a schematic side view and a schematic front view, respectively a suspension inlet duct 15 connected with a spiral flow chamber 22 with a tangential suspension inlet provided with a flange 35 sealed with a sealing 36 to a flange 37 on the upper end of the sintering drum 14, defining an axial suspension inlet opening 23. A peripheral part 34 of the end wall of the sintering drum is fixed to the drum.

Figure 18:
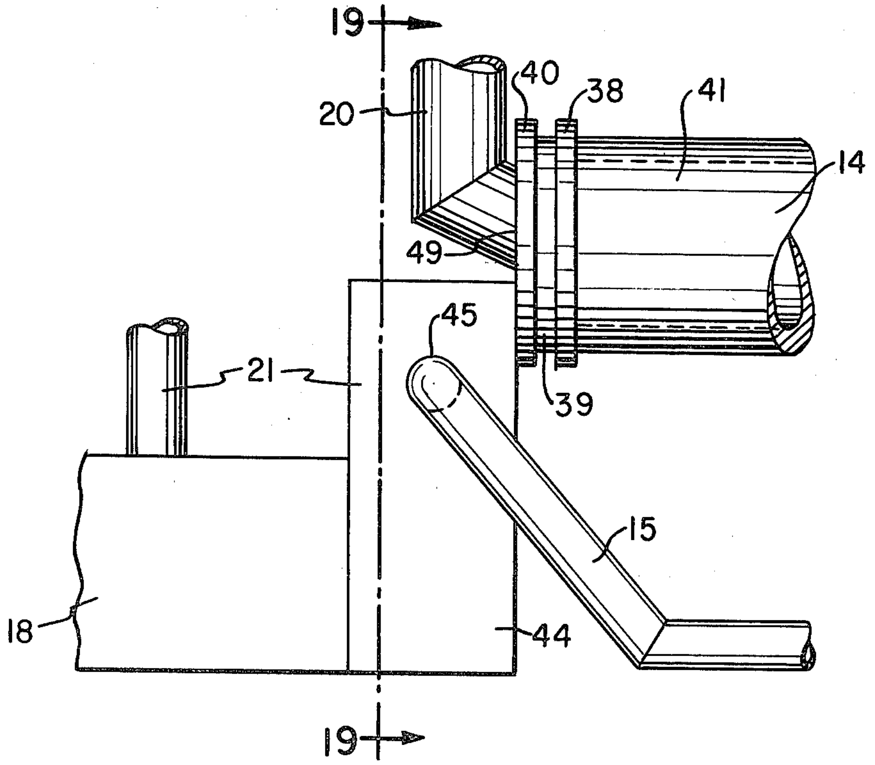
FIGS. 18–23 illustrate variations of the lower end of the sintering drum.
Figure 19:
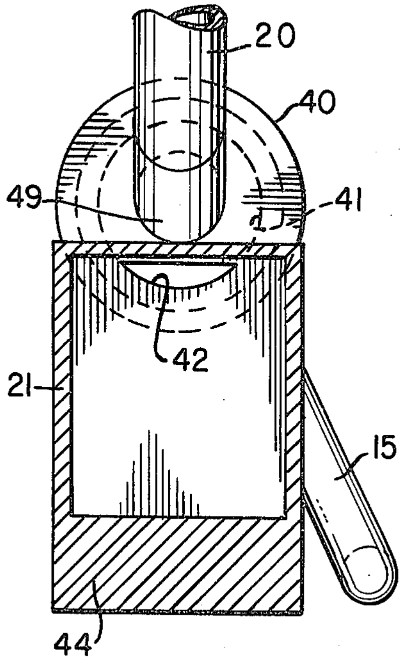
Figure 20:
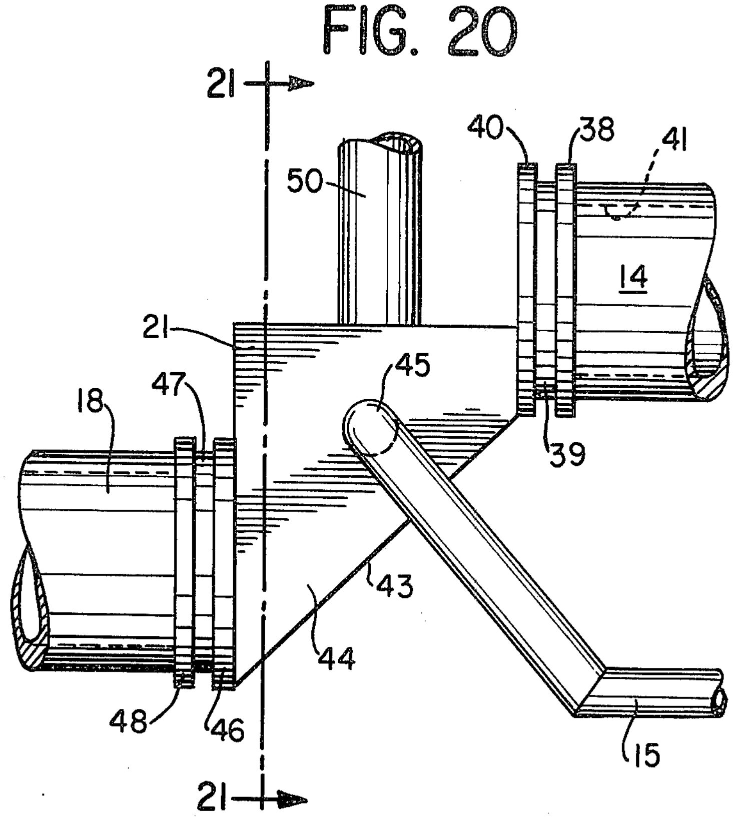
Figure 21:
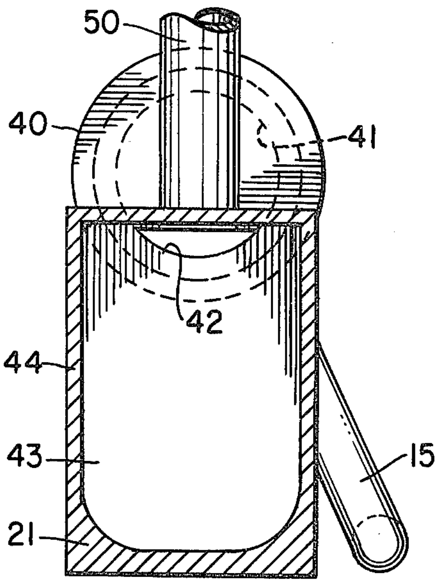
Figure 22:
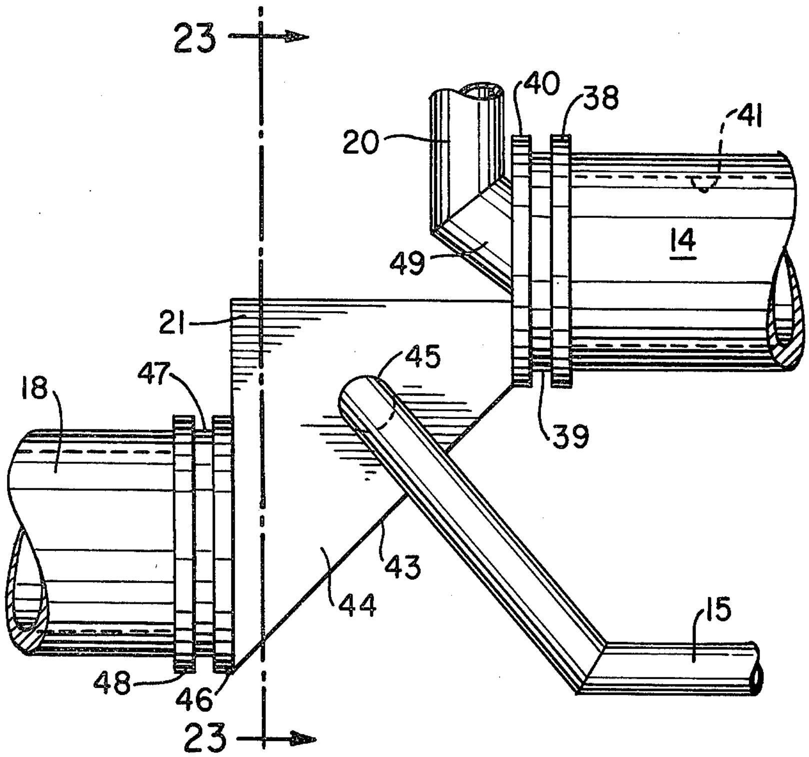
Figure 23:
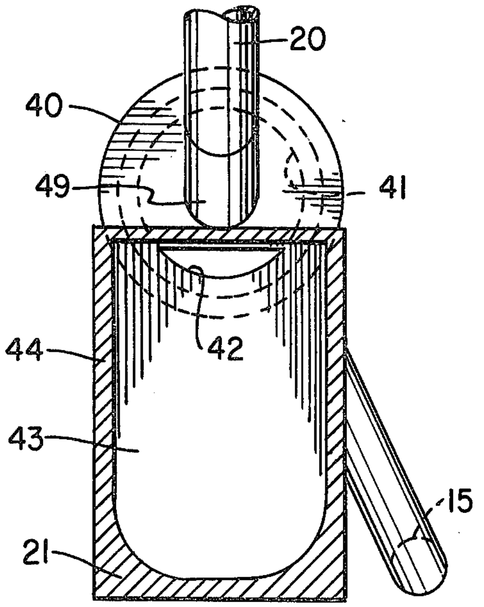

FIGS. 18, 20 and 22 show a schematic side view, details of the material outlet end of the sintering drum. FIGS. 18, 20 and 22 correspond to FIGS. 1, 6 and 10, respectively. FIGS. 19, 21 and 23 show schematic sectional views taken along the lines 19—19, 21—21 and 23—23, in FIGS. 18, 20 and 22, respectively.

FIGS. 18 to 23 show the lower part of the sintering drum 14 provided with an inner lining 41 and a flange 38 sealed with a sealing 39 to a stationary end wall 40 fixed to the air outlet 21 of the cooler 18. The lower part of the end wall 40 is provided with an opening 42 defining the clinker outlet of the sintering drum and the clinker inlet of the cooler.

In FIGS. 18, 19, 22, and 23, the upper part of the end wall 40 is provided with a second opening 49 defining an exhaust gas exit communicating with the gas outlet duct 20.

In FIGS. 18 and 19 the cooler 18 is a grate cooler with double air outlets 21, the first situated at the top of the cooler communicating with the calciner, and the second being box shaped with sidewalls 44 one of which is provided with an opening 45 communicating with the first end of the suspension inlet duct 15.

In FIGS. 20–23 the cooler 18 is a rotary drum cooler comprising a drum with an end flange 48 which by a sealing 47 is sealed to a flange 46 on an exit air hood defining the cooler air outlet 21. The exit air hood is provided with an inclined bottom plate 43 leading the clinker from the clinker outlet opening 42 to the cooler drum and with sidewalls 44 one of which is provided with an opening 45 communicating with the calciner, and the second being box shaped with sidewalls 44 one of which is provided with an opening 45 communicating with the first end of the suspension inlet duct 15.

In FIGS. 20 and 21 the top of the exit air hood is provided with a duct 50 directed to the air inlet of the calciner.

In FIGS. 22 and 23 the area of the clinker outlet opening 42 is greater than in FIGS. 20 and 21 permitting a part of the exit air from the cooler to pass to the calciner via the lower end of the sintering drum and the gas outlet duct 20.

I claim:

1. Apparatus for thermally treating pulverous materials which comprises:

(a) preheating means having inlet and outlet means for heating gas and raw materials;

(b) suspension calcining means having inlet means for fuel, combustion air and preheated raw materials, combustion gas outlet means communicating with said heating gas inlet means of said preheating means;

(c) sintering furnace means having inlet means for fuel and combustion air, and combustion gas outlet means communicating with said heating gas inlet means of said preheating means, and outlet means for the sintered product, said calcined material outlet means of said suspension calcining means communicating with said material inlet means of said sintering furnace means;

(d) air cooling means for cooling the sintered product, said air cooling means having air outlet means communicating with said air inlet means of said sintering furnace means and with said air inlet means of said suspension calcining means, and material inlet means communicating with said sintering furnace means;

(e) said sintering furnace means comprising at least one sintering drum rotatable about an axis inclined with respect to the horizontal and suspension inlet duct means provided with material inlet means and having at least a first end portion communicating with said air outlet means of said material cooling means and at least a second end portion communicating with said upper end portion of said sintering furnace means substantially tangentially to the inner surface portion of said sintering furnace means;

(f) fuel inlet means projecting into at least one of said material inlet means of said sintering furnace means and said suspension inlet duct means;

(g) combustion gas outlet duct means communicating with at least one end portion of said sintering furnace means; and (h) material outlet means for the sintered product at the lower end portion of said sintering furnace means.

2. Apparatus for thermally treating pulverous materials which comprises:

(a) preheating means having inlet and outlet means for heating gas and raw materials;

(b) suspension calcining means having inlet means for fuel, combustion air and preheated raw materials, combustion gas outlet means communicating with said heated gas inlet means of said preheating means;

(c) sintering furnace means having inlet means for fuel and combustion air, and combustion gas outlet means communicating with said hearing gas inlet means of said preheating means, and outlet means for the sintered product, said calcined material outlet means of said suspension calcining means communicating with said material inlet means of said sintering furnace means;

(d) air cooling means for cooling the sintered product, said air cooling means having air outlet means communicating with said air inlet means of said sintering furnace means and with said air inlet means of said suspension calcining means, and material inlet means communicating with said sintering furnace means;

(e) said sintering furnace means comprising at least one cylindrical member in the form of at least one sintering drum rotatable about an axis inclined with respect to the horizontal and suspension inlet duct means provided with material inlet means and having at least a first end portion communicating with said air outlet means of said material cooling means and at least a second end portion communicating with said upper end end portion of said sintering furnace means substantially tangential to the inner circumferential surface portion of said sintering drum;

(f) fuel inlet means projecting into at least one of said material inlet means of said sintering furnace means and said suspension inlet duct means;

(g) combustion gas outlet duct means communicating with at least one end portion of said sintering furnace means; and (h) material outlet means for the sintered product at the lower end portion of said sintering furnace means.

3. Apparatus for burining cement clinker comprising (a) a preheater with inlet and outlet for heating gas and inlet and outlet for pulverous cement raw material;

(b) a suspension calciner with inlets for fuel, combustion air and preheated raw materials, outlet for combustion gas connected to the heating gas inlet of the preheater and outlet for calcined material, communicating with the material inlet of;

(c) a sintering furnace with inlet for fuel and combustion air, outlet for combustion gas communicating with the heating gas inlet of the preheater and outlet for the sintered product connected to the material inlet of;

(d) an air cooler for cooling the sintered product with an air outlet connected both to the air inlet of the sintering furnace and to the air inlet of the suspension calciner;

characterized in that the sintering furnace comprises:

(e) a cylindrical member rotatable around a slightly inclined axis defining a sintering drum;

(f) a suspension inlet duct provided with a material inlet and having a first end connected to the air outlet of the cooler and a second end connected to the upper end of the sintering drum substantially tangentially to the inner circumferential surface of the sintering drum;

(g) a fuel inlet/fuel inlets projecting into the suspension inlet of the sintering drum or/and into the suspension inlet duct;

(h) a combustion gas outlet duct connected to one end of the sintering drum, and (i) an outlet for the sintered product at the lower end of the sintering drum.

4. An apparatus according to claim 3, characterized in that the sintering drum is provided with a constriction member situated at a distance from the suspension inlet constituting approximately one third of the total length of the sintering drum.

5. The apparatus according to claim 3 wherein the preheater is a single string multistage cyclone suspension preheater, characterized in that the sintering furnace combustion gas outlet communicates with the heating gas inlet of the preheater via the suspension calciner.

6. The apparatus according to claim 5, characterized in that the sintering furnace combustion gas outlet duct is provided with an inlet for preheated material.

7. The apparatus according to claim 5, characterized in that the sintering furnace combustion gas duct is provided with an inlet for calcined material and a cyclone separator defining a heat exchange unit for calcined material, the gas outlet of said cyclone being connected to the air inlet of the suspension calciner, and the material outlet of the cyclone being connected to the material inlet of the suspension furnace.

8. The apparatus according to any of claims 5, 6, or 7, characterized in that the combustion gas outlet is connected to the lower end of the sintering drum and that the outlet for the sintered product, the lowest part of the sintering drum and the combustion gas outlet provide the connection between the air outlet of the cooler and the air inlet of the suspension calciner.

9. The apparatus according to any of claims 3 or 4, wherein the preheater is a two string multistage cyclone suspension preheater, each string being provided with separate material and heating gas inlets and outlets, the heating gas inlet of the calciner/sintering furnace string being connected to to the combustion gas outlet of the suspension calciner/sintering furnace, respectively, characterized in that the sintering furnace combustion gas duct is provided with an inlet for calcined material and a cyclone separator defining a heat exchange unit for calcined material, the gas outlet of said cyclone being connected to the heating gas inlet of the sintering furnace string.

10. The apparatus according to any of claims 1–4 characterized in that the tangential connection between the second end of the suspension inlet duct and the upper end of the sintering drum is provided via a stationary cylindrical member being coaxial with and smaller in diameter than the sintering drum defining a spiral flow chamber with a tangential suspension inlet and an axial suspension outlet communicating with the sintering drum.

11. Apparatus for burning cement raw meal to cement clinker comprising:

(a) preheating means having inlet and outlet means for heating gas and raw materials;

(b) suspension calcining means having inlets for fuel, combustion air and preheated raw materials, combustion gas outlet means connected to said heated gas inlet means of said preheating means;

(c) a sintering furnace having inlet means for fuel and combustion air, and combustion gas outlet means communicaing with said heating gas inlet means of said preheating means, and outlet means for the sintered product, said calcined material outlet means of said suspension calcining means being connected to said material inlet means of said sintering furnace;

(d) an air cooler for cooling the sintered product, said air cooler having air outlet means communicating with said air inlet means of said sintering furnace and with said air inlet means of said suspension calcining means, and material inlet means communicating with said sintering furnace;

(e) said sintering furnace comprising at least one cylindrical member in the form of a sintering drum rotatable about an axis slightly inclined with respect to the horizontal, and suspension inlet duct provided with material inlet and having at least a first end portion connected to said air outlet means of said material cooling means and at least a second end portion communicating with said upper end portion of said sintering furnace means substantially tangential to the inner circumferential surface portion of said sintering drum;

(f) at least one fuel inlet projecting into at least one of said material inlet means of said sintering drum and said suspension inlet duct;

(g) a combustion gas outlet duct connected to at least one end portion of said sintering furnace; and (h) a material outlet for the sintered product at the lower end portion of said sintering furnace.

12. Apparatus for burning cement raw meal to cement clinker comprising:

(a) preheating means having inlet and outlet means for heating gas and raw materials;

(b) suspension calcining means having inlets for fuel, combustion air and preheated raw materials, combustion gas outlet means connected to said heated gas inlet means of said preheating means;

(c) a sintering furnace having inlet means for fuel and combustion air, and combustion gas outlet means communicating with said heating gas inlet means of said preheating means, and outlet means for the sintered product, said calcined material outlet means of said suspension calcining means being connected to said material inlet means of said sintering furnace;

(d) an air cooler for cooling the sintered product, said air cooler having an air oulet communicating with said air inlet of said sintering furnace and with said air inlet means of said suspension calcining means, and a material inlet means communicating with said sintering furnace;

(e) said sintering furnace comprising at least one cylindrical member in the form of a sintering drum rotatable about an axis slightly inclined with respect to the horizontal, and suspension inlet duct provided with material inlet and having at least a first end portion connected to said air outlet means of said material cooling means and at least a second end portion communicating with said upper end portion of said sintering furnace means substantially tangential to the inner circumferential surface portion of said sintering drum;

(f) at least two fuel inlets projecting into at least one of said material inlet means of said sintering drum and said suspension inlet duct;

(g) a combustion gas outlet duct connected to at least one end portion of said sintering furnace; and (h) a material outlet for the sintered product at the lower end portion of said sintering furnace.

13. Apparatus for burning cement raw meal to cement clinker comprising:

(a) a preheater having inlet and outlet for heating gas and inlet and outlet for raw material;

(b) a suspension calciner having inlets for fuel, combustion air and preheated raw materials, combustion gas outlet connected to said heated gas inlet of said preheater;

(c) a sintering furnace having inlet for fuel and combustion air, and combustion gas outlet communicating with said heating gas inlet of said preheater, and an outlet for the sintered product, said calcined material outlet of said suspension calciner being connected to said material inlet of said sintering furnace;

(d) an air cooler for cooling the cement clinker, said air cooler having an air outlet communicating with said air inlet of said sintering furnace and with said air inlet of said suspension calciner, and a material inlet communicating with said sintering furnace;

(e) said sintering furnace comprising at least one cylindrical member in the form of a sintering drum rotatable about an axis slightly inclined with respect to the horizontal, and suspension inlet duct provided with material inlet and having at least a first end portion connected to said air outlet means of said material cooling means and at least a second end porion communicating with said upper end portion of said sintering furnace means substantially tangential to the inner circumferential surface portion of said sintering drum;

(f) at least two fuel inlets projecting into at least one said material inlet of said sintering drum and said suspension inlet duct;

(g) a combustion gas outlet duct connected to at least one end portion of said sintering furnace; and (h) a material outlet for the sintered cement clinker product at the lower end portion of said sintering furnace.

14. Apparatus for thermally treating pulverulent materials which comprises:

(a) a single string multistage cyclone preheater having inlet and outlet mans for hating gas and raw materials;

(b) suspension calcining means having inlet means for fuel, combustion air and preheated raw materials, combustion gas outlet means communicating with said heated gas inlet means of said preheater;

(c) sintering furnace means having inlet means for fuel and combustion air, and combustion gas outlet means communicating with said heating gas inlet means of said preheater, and outlet means for the sintered product, said calcined material outlet means of said suspension calcining means communicating with said material inlet means of said sintering furnace means;

(d) air cooling means for cooling the sintered product, said air cooling means having air outlet means communicating with said air inlet means of said sintering furnace means and with said air inlet means of said suspension calcining means, and material inlet means communicating with said sintering furnace means;

(e) said sintering furnace means comprising at least one cylindrical member in the form of at least one sintering drum rotatable about an axis inclined with respect to the horizontal and suspension inlet duct means provided with material inlet means and having at least a first end portion communicating with said air outlet means of said material cooling means and at least a second end portion communicating with said upper end portion of said sintering furnace means substantially tangential to the inner circumferential surface portion of said sintering drum;

(f) fuel inlet means projecting into at least one of said material inlet means of said sintering furnace means and said suspension inlet duct means;

(g) combustion gas outlet duct means communicating with at least one end portiom of said sintering furnace means; and (h) material outlet means for the sintered product at the lower end portion of said sintering furnace means.

15. The apparatus according to claim 14 wherein said fuel inlet means projecting into at least one of said material inlet means of said sintering furnace means and said suspension inlet duct means is in the form of one fuel inlet.

16. The apparatus according to claim 14 wherein said fuel inlet means projecting into at least one of said material inlet means of said sintering furnace means and said suspension inlet duct means is in the form of two fuel inlets.

17. The apparatus according to claim 14 wherein said fuel inlet means projecting into at least one of said material inlet means of said sintering furnace means and said suspension inlet duct means is in the form of a plurality of fuel inlets.

18. Apparatus for thermally treating pulverulent materials such as pulverous cement raw meal, which comprises:

(a) a multistring multistage cyclone preheater having inlet and outlet means for heating gas and raw materials;

(b) suspension calcining means having inlet means for fuel, combustion air and preheated raw materials, combustion gas outlet means communicating with said heated gas inlet means of said preheater;

(c) sintering furnace means having inlet means for fuel and combustion air, and combustion gas outlet means communicating with said heating gas inlet means of said preheater, and outlet means for the sintered product, said calcined material outlet means of said suspension calcining means communicating with said material inlet means of said sintering furnace means;

(d) air cooling means for cooling the sintered product, said air cooling means having air outlet means communicating with said air inlet means of said sintering furnace means and with said air inlet means of said suspension calcining means, and material inlet means communicating with said sintering furnace means;

(e) said sintering furnace means comprising at least one cylindrical member in the form of at least one sintering drum rotatable about an axis inclined with respect to the horizontal and suspension inlet duct means provided with material inlet means and having at least a first end portion communicating with said air outlet means of said material cooling means and at least a second end portion communicating with said upper end portion of said sintering furnace means;

(f) fuel inlet means projecting into at least one of said material inlet means of said sintering furnace means and said suspension inlet duct means;

(g) combustion gas outlet duct means communicating with at least one end portion of said sintering furnace means substantially tangential to the inner circumferential surface portion of said sintering drum; and (h) material outlet means for the sintered product at the lower end portion of said sintering furnace means.

19. The apparatus according to claim 18 wherein said multistring multistage cyclone preheater is in the form of a two string multistage cyclone preheater.

20. The apparatus according to claim 19 wherein said fuel inlet means projecting into at least one of said material inlet means of said sintering furnace means and said suspension inlet duct means is in the form of one fuel inlet.

21. The apparatus according to claim 19 wherein said fuel inlet means projecting into at least one of said material inlet means of said sintering furnace means and said suspension inlet duct means is in the form of two fuel inlets.

22. The apparatus according to claim 19 wherein said fuel inlet means projecting into at least one of said material inlet means of said sintering furance means and said suspension inlet duct means is in the form of two fuel inlets.

* * * * *